(12) United States Patent
Corley et al.

(10) Patent No.: US 7,108,129 B2
(45) Date of Patent: Sep. 19, 2006

(54) OPTICAL DISK STORAGE CASE WITH BLOCKING TONGUE

(75) Inventors: Ryan Corley, Austin, TX (US); Mark Pempsell, Bedford, TX (US)

(73) Assignee: EnXnet, Inc., Tulsa, OK (US)

( * ) Notice: Subject to any disclaimer, the term of this patent is extended or adjusted under 35 U.S.C. 154(b) by 0 days.

(21) Appl. No.: 10/950,079

(22) Filed: Sep. 24, 2004

(65) Prior Publication Data

US 2005/0077196 A1    Apr. 14, 2005

Related U.S. Application Data

(60) Provisional application No. 60/510,384, filed on Oct. 10, 2003.

(51) Int. Cl.
*B65D 85/57* (2006.01)

(52) U.S. Cl. .................................. 206/308.1; 220/377

(58) Field of Classification Search ............ 206/308.1, 206/308.2, 309–313; D6/634–635; 220/377
See application file for complete search history.

(56) References Cited

U.S. PATENT DOCUMENTS

| | | | |
|---|---|---|---|
| 1,458,955 A * | 6/1923 | Russakov ................... | 220/377 |
| 4,084,690 A | 4/1978 | Pulse | |
| 4,535,888 A | 8/1985 | Nusselder | |
| 4,709,437 A | 12/1987 | Hehn et al. | |
| 4,709,812 A | 12/1987 | Kosterky | |
| 4,750,618 A | 6/1988 | Schubert | |
| 4,793,479 A | 12/1988 | Otsuka et al. | |
| 4,793,480 A | 12/1988 | Gelardi et al. | |
| 5,101,971 A | 4/1992 | Grobecker | |
| 5,238,107 A | 8/1993 | Kownacki | |
| 5,244,085 A | 9/1993 | Lammerant et al. | |
| 5,249,677 A | 10/1993 | Lim | |
| 5,251,750 A | 10/1993 | Gelardi et al. | |
| 5,269,409 A | 12/1993 | Brandt et al. | |
| 5,279,097 A | 1/1994 | Weisburn et al. | |
| 5,284,242 A | 2/1994 | Roth | |
| 5,284,243 A | 2/1994 | Gelardi et al. | |
| 5,284,248 A | 2/1994 | Dunker | |
| 5,285,983 A | 2/1994 | Modinger et al. | |
| 5,322,162 A | 6/1994 | Melk | |
| 5,361,903 A | 11/1994 | Thiele | |
| 5,400,902 A | 3/1995 | Kaminski | |
| 5,402,882 A | 4/1995 | Bandy et al. | |
| 5,417,324 A | 5/1995 | Joyce et al. | |
| 5,450,951 A | 9/1995 | Luckow | |
| 5,462,159 A | 10/1995 | Roth et al. | |
| 5,477,961 A | 12/1995 | Taniyama | |
| 5,494,156 A | 2/1996 | Nies | |
| 5,515,968 A | 5/1996 | Taniyama | |

(Continued)

*Primary Examiner*—Bryon P. Gehman
(74) *Attorney, Agent, or Firm*—Baker Botts L.L.P.

(57) ABSTRACT

An optical disc storage case includes a base, a cover pivotally coupled to the base, a pedestal coupled to the base and having at least one pair of resilient members configured to retain an optical disc thereon, a blocking tongue coupled to a top portion of the cover and extending outwardly therefrom, and a groove associated with a top portion of the base and extending outwardly therefrom. The groove is configured to align the blocking tongue when the optical disc storage case is in a closed position and, when the pedestal is retaining the optical disc, the blocking tongue and the groove are engaged with one another such that access to the optical disc is prevented when a user slightly separates the respective top portions of the base and the cover.

15 Claims, 2 Drawing Sheets

U.S. PATENT DOCUMENTS

| | | | |
|---|---|---|---|
| 5,522,501 A | 6/1996 | Luckow | |
| 5,526,926 A | 6/1996 | Deja | |
| 5,573,120 A | 11/1996 | Kaufman | |
| 5,575,387 A | 11/1996 | Gelardi | |
| 5,586,651 A | 12/1996 | Krummenacher | |
| 5,609,249 A | 3/1997 | Cheng | |
| 5,626,225 A | 5/1997 | Joyce, Jr. | |
| 5,651,458 A | 7/1997 | Brosmith et al. | |
| 5,660,274 A | 8/1997 | Chien | |
| 5,685,425 A | 11/1997 | Choi | |
| 5,685,427 A | 11/1997 | Kuitems et al. | |
| D387,217 S * | 12/1997 | Lakoski et al. | D6/634 |
| 5,704,474 A | 1/1998 | Oland | |
| 5,706,938 A | 1/1998 | Niehaus | |
| 5,706,939 A | 1/1998 | Yu | |
| 5,706,943 A | 1/1998 | Yu | |
| 5,706,955 A | 1/1998 | Andersson | |
| 5,707,124 A | 1/1998 | Johnson et al. | |
| 5,713,463 A | 2/1998 | Lakoski et al. | |
| 5,713,464 A | 2/1998 | Chang | |
| 5,720,386 A | 2/1998 | Allsop et al. | |
| 5,727,680 A | 3/1998 | Liu | |
| 5,727,681 A | 3/1998 | Li | |
| 5,730,283 A | 3/1998 | Lax | |
| RE35,761 E | 4/1998 | Dardashti | |
| 5,735,396 A | 4/1998 | Condorodis | |
| 5,738,221 A | 4/1998 | Van Witt et al. | |
| 5,746,314 A | 5/1998 | Knutsen et al. | |
| 5,746,315 A | 5/1998 | Luckow | |
| 5,748,608 A | 5/1998 | Spector | |
| 5,749,464 A | 5/1998 | Cheris et al. | |
| 5,768,253 A | 6/1998 | Tricart | |
| 5,769,217 A | 6/1998 | Derraugh et al. | |
| 5,769,227 A | 6/1998 | Fantone | |
| 5,772,018 A | 6/1998 | Walch | |
| 5,772,021 A | 6/1998 | Bolenbaugh et al. | |
| 5,775,491 A | 7/1998 | Taniyama | |
| 5,775,494 A | 7/1998 | Taplin | |
| 5,779,037 A | 7/1998 | D'Argo et al. | |
| 5,779,038 A | 7/1998 | Herr et al. | |
| 5,779,040 A | 7/1998 | Attar et al. | |
| 5,782,348 A | 7/1998 | Burdett | |
| 5,785,172 A | 7/1998 | Bolognia et al. | |
| 5,788,068 A | 8/1998 | Fraser et al. | |
| 5,793,742 A | 8/1998 | Sandell et al. | |
| 5,799,782 A | 9/1998 | Gelardi | |
| 5,799,783 A | 9/1998 | Cheris et al. | |
| 5,803,251 A | 9/1998 | Gartz | |
| 5,806,672 A | 9/1998 | Bosworth | |
| 5,813,525 A | 9/1998 | McQueeny | |
| 5,813,526 A | 9/1998 | Grobecker et al. | |
| 5,815,344 A | 9/1998 | Aoki | |
| 5,829,582 A | 11/1998 | Ippolito et al. | |
| 5,855,273 A | 1/1999 | Grobecker et al. | |
| 5,881,872 A | 3/1999 | Frick | |
| 5,887,713 A | 3/1999 | Smith et al. | |
| 5,894,924 A | 4/1999 | Koch | |
| 5,896,986 A | 4/1999 | Bolognia et al. | |
| 5,906,274 A | 5/1999 | McEwan | |
| 5,906,276 A | 5/1999 | Bolognia et al. | |
| 5,915,550 A | 6/1999 | Gartz | |
| 5,931,294 A | 8/1999 | Weingarden et al. | |
| 5,938,021 A | 8/1999 | Grobecker | |
| 5,944,181 A | 8/1999 | Lau | |
| 5,984,093 A | 11/1999 | Frick | |
| 5,984,094 A | 11/1999 | Frick | |
| 5,988,375 A | 11/1999 | Chang | |
| 5,996,788 A | 12/1999 | Belden, Jr. et al. | |
| 6,021,894 A | 2/2000 | Lakoski et al. | |
| 6,024,214 A | 2/2000 | Cowan | |
| 6,024,215 A | 2/2000 | Leung | |
| 6,029,848 A | 2/2000 | Cha et al. | |
| 6,041,922 A | 3/2000 | Kellinek | |
| 6,053,311 A | 4/2000 | Grobecker et al. | |
| 6,065,593 A | 5/2000 | Howerton et al. | |
| 6,065,594 A | 5/2000 | Sankey et al. | |
| 6,085,900 A | 7/2000 | Wong | |
| 6,116,417 A | 9/2000 | Yoshinaga | |
| 6,155,417 A * | 12/2000 | Flores et al. | 206/308.1 |
| 6,164,446 A * | 12/2000 | Law | 206/308.1 |
| 6,170,656 B1 | 1/2001 | Cerda-Vilaplana et al. | |
| 6,179,120 B1 | 1/2001 | Chou | |
| 6,196,384 B1 | 3/2001 | Belden, Jr. | |
| 6,206,186 B1 | 3/2001 | Cerda-Vilaplana et al. | |
| 6,227,362 B1 | 5/2001 | Cheung | |
| 6,237,763 B1 | 5/2001 | Lau | |
| 6,241,088 B1 | 6/2001 | Lin et al. | |
| 6,241,089 B1 | 6/2001 | Grobecker | |
| 6,250,461 B1 | 6/2001 | Hu | |
| 6,276,524 B1 | 8/2001 | Cerda-Vilaplana et al. | |
| 6,283,282 B1 | 9/2001 | Wong et al. | |
| 6,283,283 B1 | 9/2001 | Rufo, Jr. et al. | |
| 6,283,284 B1 | 9/2001 | Crane et al. | |
| 6,283,286 B1 | 9/2001 | Hu | |
| 6,286,671 B1 | 9/2001 | Liu et al. | |
| 6,293,396 B1 | 9/2001 | Takahashi et al. | |
| 6,298,986 B1 | 10/2001 | Chang | |
| 6,302,288 B1 | 10/2001 | Nava et al. | |
| 6,311,835 B1 | 11/2001 | Okuhara et al. | |
| 6,318,550 B1 | 11/2001 | Giovinazzi | |
| 6,334,268 B1 | 1/2002 | Ikebe et al. | |
| 6,347,702 B1 | 2/2002 | Bruderer et al. | |
| 6,354,435 B1 | 3/2002 | Belden, Jr. et al. | |
| 6,364,108 B1 | 4/2002 | Bin | |
| 6,382,415 B1 | 5/2002 | Cha | |
| 6,386,361 B1 | 5/2002 | Ting | |
| 6,394,266 B1 | 5/2002 | Chou | |
| 6,398,022 B1 | 6/2002 | Mou et al. | |
| 6,401,920 B1 | 6/2002 | Gelardi | |
| 6,405,860 B1 | 6/2002 | Raucci, Jr. | |
| 6,412,629 B1 | 7/2002 | Gordon et al. | |
| 6,412,631 B1 | 7/2002 | Belden, Jr. | |
| 6,415,918 B1 | 7/2002 | Wong et al. | |
| 6,425,481 B1 | 7/2002 | Choi | |
| 6,427,833 B1 | 8/2002 | Hui | |
| 6,431,352 B1 | 8/2002 | Khosia | |
| 6,443,299 B1 | 9/2002 | Kuremoto et al. | |
| 6,450,332 B1 | 9/2002 | Courchesne | |
| 6,454,087 B1 | 9/2002 | Gordon et al. | |
| 6,454,090 B1 | 9/2002 | Flores, Jr. et al. | |
| 6,464,072 B1 | 10/2002 | Gordon et al. | |
| 6,464,073 B1 | 10/2002 | Tang | |
| 6,467,616 B1 | 10/2002 | Hegarty et al. | |
| 6,478,148 B1 | 11/2002 | Gordon et al. | |
| 6,478,150 B1 | 11/2002 | Sølling | |
| 6,481,484 B1 | 11/2002 | Isshiki | |
| 6,502,694 B1 | 1/2003 | Pijanowski et al. | |
| 6,516,852 B1 | 2/2003 | Sandor | |
| 6,523,683 B1 | 2/2003 | Fraser et al. | |
| 6,523,685 B1 | 2/2003 | Rufo, Jr. et al. | |
| 6,530,474 B1 | 3/2003 | Rufo, Jr. et al. | |
| 6,540,071 B1 | 4/2003 | Liu | |
| 6,547,067 B1 | 4/2003 | Liu | |
| 6,547,068 B1 | 4/2003 | Chu | |
| 6,547,069 B1 | 4/2003 | Chang | |
| 6,550,612 B1 | 4/2003 | Tajima | |
| 6,554,132 B1 | 4/2003 | Lau | |
| 6,561,347 B1 | 5/2003 | Lax | |
| 6,568,526 B1 | 5/2003 | Reinhardt et al. | |
| 6,571,943 B1 | 6/2003 | Gordon et al. | |
| 6,581,766 B1 | 6/2003 | Hui | |
| 6,609,614 B1 | 8/2003 | Huang | |
| 6,626,290 B1 | 9/2003 | Byrne et al. | |
| 6,637,589 B1 * | 10/2003 | Broadhead | 206/308.2 |

| | | | | | | |
|---|---|---|---|---|---|---|
| 6,648,135 B1 | 11/2003 | Ho | | 2002/0162760 A1 | 11/2002 | Tajima |
| 6,651,811 B1 | 11/2003 | Hai | | 2003/0015442 A1 | 1/2003 | Chu |
| 6,669,018 B1 | 12/2003 | Lau | | 2003/0019771 A1 | 1/2003 | Iandoli et al. |
| 6,681,930 B1 | 1/2004 | Yang | | 2003/0019772 A1 * | 1/2003 | Chan .................. 206/310 |
| 6,712,203 B1 | 3/2004 | Chung | | 2003/0034258 A1 | 2/2003 | Lee |
| 6,726,007 B1 | 4/2004 | Huang | | 2003/0034260 A1 | 2/2003 | Chang |
| 6,726,008 B1 | 4/2004 | Lee | | 2003/0070946 A1 | 4/2003 | Liu |
| 6,729,469 B1 | 5/2004 | Yau et al. | | 2003/0136689 A1 | 7/2003 | Mathieu |
| 6,732,859 B1 | 5/2004 | Kuremoto et al. | | 2003/0205491 A1 | 11/2003 | Huang |
| 6,732,862 B1 | 5/2004 | Hu | | 2004/0007482 A1 | 1/2004 | Wen-Long |
| 6,766,904 B1 | 7/2004 | Hu | | 2004/0020802 A1 | 2/2004 | Chang |
| 6,779,659 B1 | 8/2004 | Marsilio et al. | | 2004/0079657 A1 | 4/2004 | Yau et al. |
| 6,789,667 B1 | 9/2004 | Belden, Jr. et al. | | 2004/0099549 A1 | 5/2004 | Hu |
| 6,799,677 B1 | 10/2004 | Marsilio et al. | | 2004/0159563 A1 | 8/2004 | Hui |
| 6,805,238 B1 * | 10/2004 | Iandoli et al. ......... 206/310 | | 2004/0163976 A1 | 8/2004 | Krummenacher |
| 6,929,123 B1 * | 8/2005 | Lau ..................... 206/308.1 | | 2004/0178091 A1 | 9/2004 | Lau |
| 2002/0112976 A1 | 8/2002 | Huber | | | | |
| 2002/0162759 A1 * | 11/2002 | Deitrickson ......... 206/308.1 | | * cited by examiner | | |

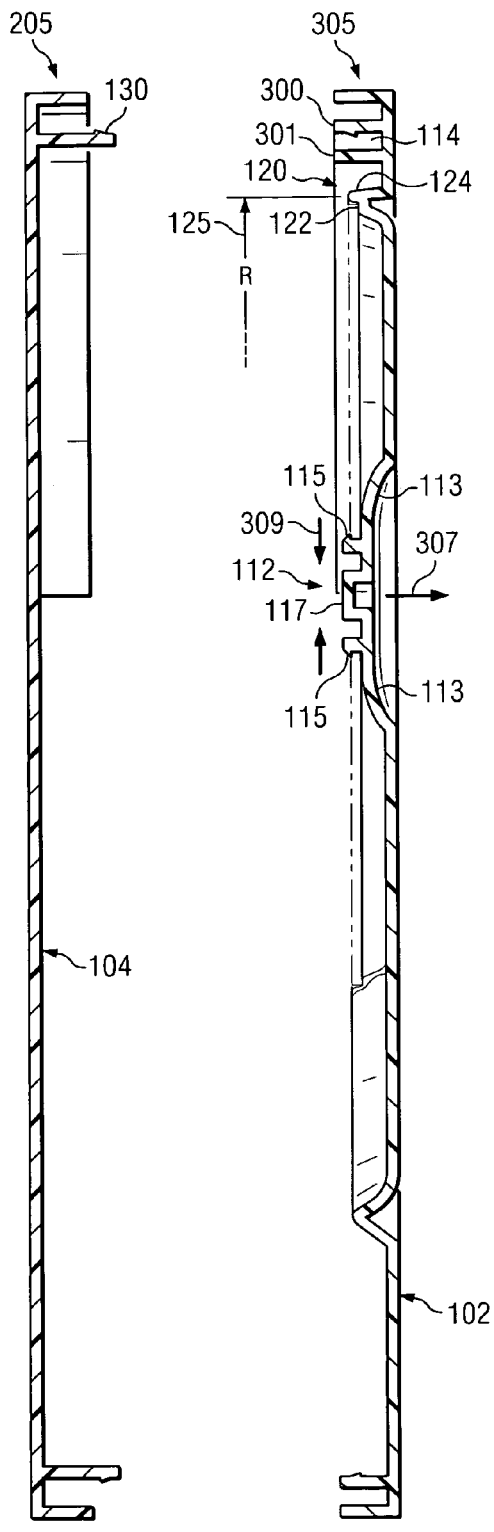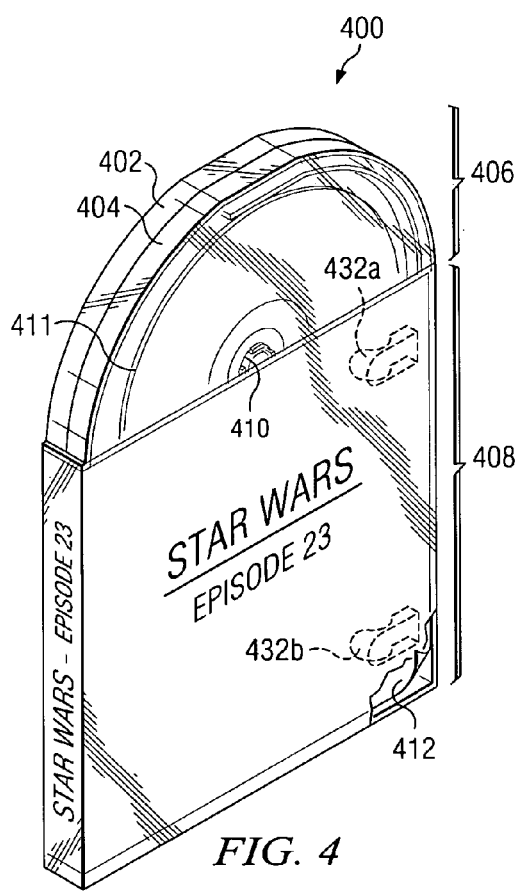

OPTICAL DISK STORAGE CASE WITH BLOCKING TONGUE

RELATED APPLICATIONS

This application claims the benefit of U.S. Provisional Patent Application Ser. No. 60/510,384 titled "Optical Disk Storage Device," filed on Oct. 10, 2003.

FIELD OF THE INVENTION

This invention relates generally to storage systems for optical discs, such as compact discs ("CDs") and digital versatile discs ("DVDs"), and, more particularly, to an optical disc storage case.

BACKGROUND OF THE INVENTION

Optical discs, such as CDs and DVDs, are increasingly popular with today's consumers. Because of the nature and cost of optical discs, their storage is important with respect to both protection and theft prevention. Conventional plastic packaging and vacuum molded cases for DVD's and CD's have been on the market for several years. The majority of the commercial storage cases on the market today consist of a vacuum molded case. A common disc storage case includes a box body, a cover body pivotally connected to one side of the box body, a rectangular peripheral frame being disposed along the other three sides of the box body, a middle section of a front face of the peripheral frame being formed with an inward recess, an annular stepped projection being formed in the box body, an outer circumference of the annular projection being formed with several arch recesses at equal intervals, and a center of the annular projection being disposed with two opposite cantilevered resilient arms. When it is desired to take out the disc, a user only needs to depress the cantilevered resilient arms to disengage the disc from the cantilevered resilient arms.

The most prevalent problem with such a disc box structure is theft of the optical disc. Theft of the optical disc is typically performed by making an insertion to the outer packaging at the top of the disc box structure, squeezing the sides of the disc box structure to thereby expose the optical disc. By inserting the fingers of the opposite hand, the optical disc can be removed from the disc box structure and the disc box structure can be placed back on a display, thereby allowing the thief to leave the premises with the optical disc undetected.

SUMMARY OF INVENTION

According to one embodiment of the invention, an optical disc storage case includes a base, a cover pivotally coupled to the base, a pedestal coupled to the base and having at least one pair of resilient members configured to retain an optical disc thereon, a blocking tongue coupled to a top portion of the cover and extending outwardly therefrom, and a groove associated with a top portion of the base and extending outwardly therefrom. The groove is configured to align the blocking tongue when the optical disc storage case is in a closed position and, when the pedestal is retaining the optical disc, the blocking tongue and the groove are engaged with one another such that access to the optical disc is prevented when a user slightly separates the respective top portions of the base and the cover.

According to another embodiment of the invention, an optical disc storage case includes a base, a cover pivotally coupled to the base by a hinge portion disposed between respective sides of the base and the cover, a disc well associated with the base and substantially defined by a penannular disc support channel. The penannular disc support channel includes a ledge configured to provide vertical support for an optical disc and a lateral support protuberance adjacent the ledge configured to provide lateral support for the optical disc. The storage case also includes a thumb well coupled to opposed ends of the penannular disc support channel and located near a bottom of the base and a pedestal coupled to the base and associated with approximately a center of the disc well. The pedestal has at least one pair of resilient members configured to retain the optical disc thereon.

Embodiments of the invention may provide a number of technical advantages. Embodiments of the invention may include all, some, or none of these advantages. In one embodiment, when a user desires to open an optical disc storage case, the user only needs to insert a finger into the latch trough at the side of the case. When opened, the base includes an penannular disc support channel including a lateral support protuberance that extends slightly above the outer edge of the optical disc. A pedestal includes cantilevered resilient arms to securely retain an optical disc. There may also be a semi-circular thumb well near the bottom of the disc support channel allowing the user to grab the edge of the optical disc in a selected position. The user applies pressure to the cantilevered resilient arms with the thumb or finger while at the same time inserting a finger or thumb into the semi-circular thumb well, thereby releasing the optical disc from the pedestal.

This case side may have a recessed circular groove slightly larger than the penannular disc support channel extending upwardly from the base. The recessed circular groove serves as an alignment guide and structure for a blocking tongue extending upwardly from the cover. The groove and the tongue work in conjunction with one another such that, when in the case is in a closed position, they act as a theft deterrent.

In one embodiment, the present invention provides an optical disc storage case of significant change in appearance. While the most common disc storage container present in retail outlets is of a standard size rectangular DVD enclosure, the present invention may include a semi-circular top portion of an optical disc storage case. By rounding the top of the disc case it will distinguish the present invention from what is presently available in the market place.

Other technical advantages are readily apparent to one skilled in the art from the following figures, descriptions, and claims.

BRIEF DESCRIPTION OF THE DRAWINGS

FIG. 2 is a cross-section of a cover of the optical disc storage case of FIG. 1;

FIG. 3 is a cross-section of a base of the optical disc storage case of FIG. 1; and FIG. 4 is an elevation view of an optical disc storage case in a closed position according to an alternative embodiment of the present invention.

DETAILED DESCRIPTION

Figure 1:
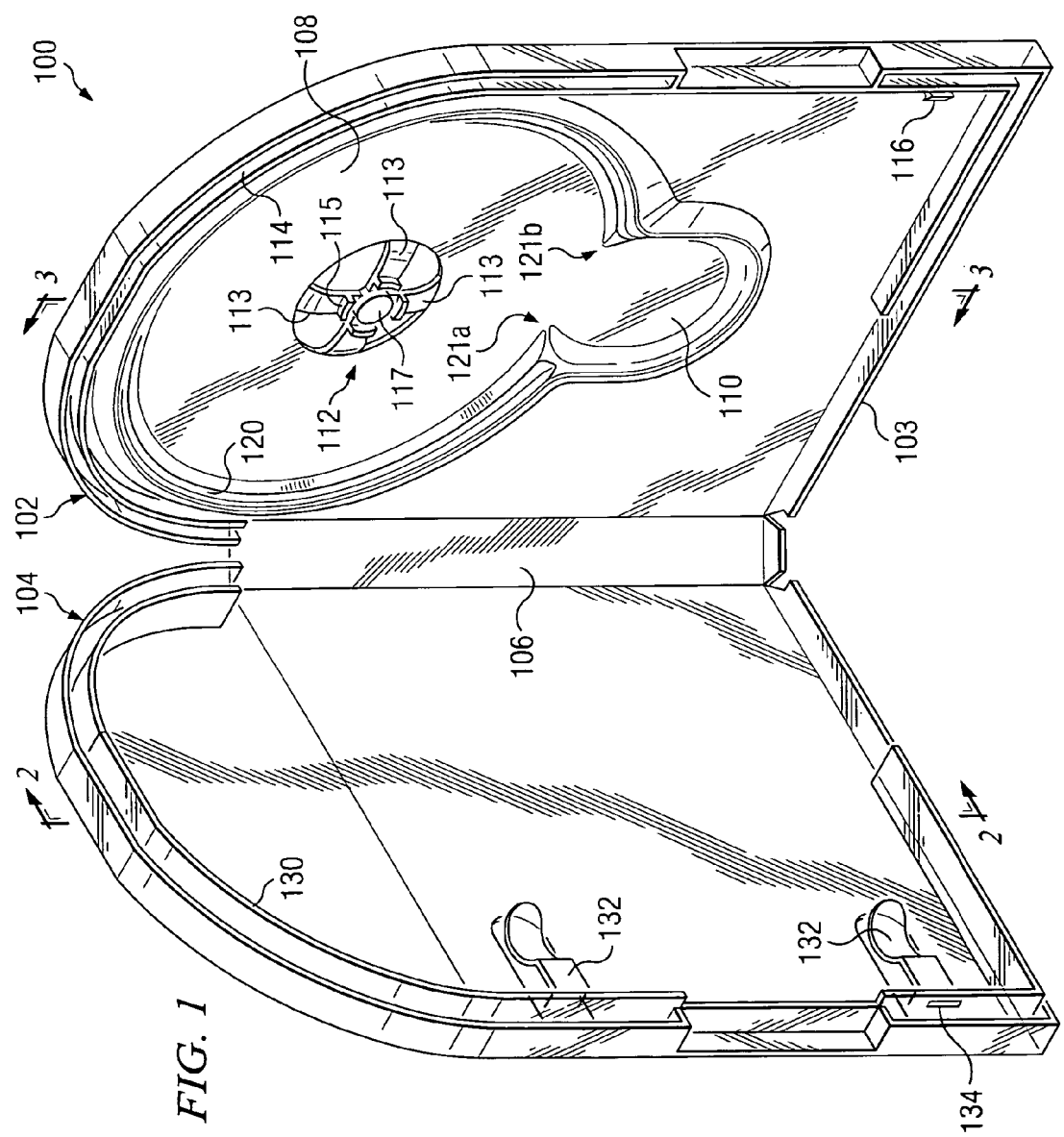
FIG. 1 is a perspective view of an optical disc storage case in an open position according to one embodiment of the present invention.

Example embodiments of the present invention are best understood by referring now to FIGS. 1 through 4 of the drawings, in which like numerals refer to like parts.

FIG. 1 is a perspective view of an optical disc storage case 100 shown in an open position according to one embodiment of the present invention. Although optical disc storage case 100 is discussed herein in the context of housing compact discs ("CDs") and digital versatile discs ("DVDs"), the present invention contemplates optical disc storage case 100 housing any suitable object. Optical disc storage case 100 may be formed from any suitable material. For example, optical disc storage case 100 may be formed from a suitable polymer, such as polypropylene. In addition, optical disc storage case 100 may have any suitable configuration with any suitable dimensions.

In the illustrated embodiment, optical disc storage case 100 includes a base 102 and a cover 104 pivotally coupled to base 102 by a hinge portion 106. Although cover 104 is illustrated as being coupled to base 102 along respective sides of base 102 and cover 104, the present invention contemplates cover 104 being coupled to base 102 in any suitable location. The present invention also contemplates other suitable coupling methods for cover 102 and base 102, such as base 102, cover 104, and hinge portion 106 being formed integral to one another.

In the illustrated embodiment, base 102 includes a disc well 108, a thumb well 110 adjacent disc well 108, a pedestal 112, a groove 114, and one or more latches 116. The present invention contemplates base 102 having more, less, or different components than those illustrated in FIG. 1.

Disc well 108 is where an optical disc (not explicitly illustrated) resides when an optical disc is retained by pedestal 112. In the illustrated embodiment, disc well 108 is substantially defined by a penannular disc support channel 120. Although disc support channel 120 may have other suitable configurations, it is preferable that disc support channel 120 be penannular to accommodate thumb well 110 being coupled to opposed ends 121a, 121b of disc support channel 120. Penannular disc support channel 120 is described in further detail below in conjunction with FIG. 3.

Thumb well 110, may have any suitable size and shape and may be located on base 102 in any suitable location. In one embodiment, thumb well 110 is located near a bottom 103 of base 102. In this location, when a user desires to remove an optical disc from pedestal 112 after opening storage case 100, the user merely applies pressure to pedestal 112 with a thumb or finger while at the same time inserting a finger or thumb into thumb well 110 to easily release the optical disc from pedestal 112. This removal action is discussed in greater detail below.

Pedestal 112, as briefly described above, functions to retain an optical disc thereon. In the illustrated embodiment, pedestal 112, includes two pairs of resilient members 113 that are configured to retain the optical disc. Each resilient member 113 includes a latch 115 that engages an aperture formed in the center of the optical disc to secure the optical disc to pedestal 112. In the center of pedestal 112 is a button 117 that allows a user to press his or her finger or thumb thereon in order to depress resilient members 113 and displace latches 115 toward the center of pedestal 112 in order to release the optical disc therefrom. Further details and functional description of pedestal 112 are described below in conjunction with FIG. 3.

Groove 114 is associated with a top portion of base 102 that may be defined by a pair of walls 300, 301 as illustrated best in FIG. 3. Although groove 114 may extend around any suitable portion of the perimeter of the top portion of base 102, in one embodiment, groove 114 extends around a majority of the perimeter of the top portion of base 102. As described in further detail below, groove 114 functions to align a blocking tongue 130 associated with cover 104 when optical disc storage case 100 is in a closed position.

Latch 116 functions to secure optical disc 100 in a closed position. There may be any number of latches 116 and they may be associated with either base 102 or cover 104. Each latch 116 engages an associated depression 134 in order to secure optical disc storage case 100 in a closed position. The present invention contemplates any suitable manner of securing optical disc storage case 100 in a closed position.

In the illustrated embodiment, cover 104 includes blocking tongue 130 and a pair of retaining clips 132. The present invention contemplates cover 104 having more, less, or different components than those illustrated in FIG. 1.

Similar to groove 114 on base 102, blocking tongue 130 may extend around any suitable portion of the perimeter of the top portion of cover 104. In one embodiment, blocking tongue 130 extends around a majority of the perimeter of the top portion of cover 104. Further details of blocking tongue 130 are described below in conjunction with FIG. 2.

Retaining clips 132 are configured to retain print media on cover 104. Retaining clips 132 may have any suitable configuration and may couple to cover 104 in any suitable manner. In the illustrated embodiment, retaining clips 132 are "spring-like" members that possess enough resiliency in order to allow print media to be slid thereunder. One example of print media is shown below in conjunction with FIG. 4.

FIG. 2 is a cross-section of cover 104 and FIG. 3 is a cross-section of base 102 illustrating their components in more detail. Referring to FIGS. 2 and 3, the interaction of blocking tongue 130 and groove 114 is illustrated. As described above, groove 114 is configured to align blocking tongue 130 when optical disc storage case 100 is in a closed position. Although blocking tongue 130 may have any suitable depth, it is preferable that blocking tongue 130 extend as deeply into groove 114 as possible when optical disc storage case 100 is in a closed position. This is because when pedestal 112 is retaining an optical disc (as shown in dashed lines), blocking tongue 130 and groove 114 are engaged with one another such that access to the optical disc is prevented when a thief slightly separates respective top portions 205, 305 of cover 104 and base 102, respectively. With prior optical storage devices, a thief merely had to slightly pry open the top portions of the cover and base in order to slide the optical disc out from inside the case.

Referring now to FIG. 3, additional details of disc support channel 120 are shown. In the illustrated embodiment, disc support channel 120 includes a ledge 122 and a lateral support protuberance 124. Ledge 122, which may have any suitable width, is configured to provide vertical support for an optical disc when optical disc is retained by pedestal 112. Lateral support protuberance 124 is configured to provide lateral support for the optical disc. As shown in FIG. 3, a radius 125 of lateral support protuberance 124, in one embodiment, is slightly larger than a radius of the optical disc. It should be noted that when the optical disc is retained by pedestal 112, it may or may not be touching ledge 122 and/or lateral support protuberance 124.

The lateral support provided by lateral support protuberance 124 is particularly advantageous when a user desires to remove an optical disc from pedestal 112. As described above, when a user desires to remove an optical disc from pedestal 112, he or she depresses button 117 of pedestal 112 while simultaneously lifting up on the bottom of the optical disc by thumb well 110. Resilient members 113 are displaced downwardly, as indicated by arrow 307, which then pushes in latches 115 toward button 117, as indicated by arrows 309. This action releases optical disc from latches 115 of pedestal 112 and the optical disc moves laterally towards the top of base 102 where it may engage lateral support protuberance 124. This facilitates easier removal of the optical disc by the user.

FIG. 4 is an elevation view of an optical disc storage case 400 in a closed position according to another embodiment of the present invention. In the illustrated embodiment, optical disc storage case 400 includes a base 402 and a cover 404 pivotally coupled to base 402. Cover 404 includes a top portion 406 formed from a transparent material and a bottom portion 408. A pedestal 410 is coupled to base 402 and is configured to retain an optical disc 411 thereon.

In this embodiment, bottom portion 408 includes a pair of retaining clips 432a, 432b in order to secure a print media 412 thereto. In one embodiment, retaining clips 432a, 432b are associated with only bottom portion 408, which may be generally rectangular in shape or have other suitable configurations. In addition, top portion 406, in one embodiment, has a semi-circular shape; however, other suitable shapes are contemplated by the present invention. Both top portion 406 and bottom portion 408 may have any suitable dimensions also. For example, optical disc storage case 400 may have dimensions that cause case 400 to resemble a jewel case.

In the embodiment illustrated in FIG. 4, when pedestal 410 is retaining optical disc 411 thereon and optical disc storage case 400 is in a closed position, a user may see a portion of optical disc 411 through the transparent material of top portion 406 of cover 404. This user may be a consumer that desires to purchase the optical disc 411 and the consumer is ensured that he or she is not wasting their money on an empty disc case. Or the user may be an employee of a retailer that can see the optical disc 411 when a consumer is purchasing the optical disc 411, which ensures the retailer that the optical disc 411 was in the case 400 when purchased so the consumer does not come back at a later time and claim that the optical disc 411 was not there when purchased.

Although not illustrated in any of FIGS. 1 through 4, a suitable electronic article surveillance system may be associated with optical disc storage cases 100, 400, or an optical disc being housed by optical disc storage cases 100, 400 to enhance the anti-theft feature(s) of the present invention. For example, such an electronic article surveillance system may be one that is shown and described in conjunction with U.S. patent application Ser. No. 10/850,990, which is herein incorporated by reference.

Although embodiments of the invention and their advantages are described in detail, a person skilled in the art could make various alterations, additions, and omissions without departing from the spirit and scope of the present invention as defined by the appended claims.

What is claimed is:

1. An optical disc storage case, comprising:
   a base;
   a cover pivotally coupled to the base;
   a disc well associated with the base and substantially defined by a penannular disc support channel comprising:
      a ledge configured to provide vertical support for an optical disc; and
      a lateral support protuberance adjacent the ledge configured to provide lateral support for the optical disc;
   a thumb well adjacent the disc well;
   a pedestal coupled to the base and associated with a center of the disc well, the pedestal having at least one pair of resilient members configured to retain the optical disc thereon;
   a blocking tongue coupled to the cover and extending outwardly therefrom;
   a groove associated with the base and extending outwardly therefrom, the groove configured to align the blocking tongue when the optical disc storage case is in a closed position;
   a pair of retaining clips coupled to the cover and operable to retain print media thereon; and
   a latch coupled to either the base or the cover and operable to secure the optical disc storage case in a closed position;
   wherein the base and the cover each have semicircular top portions; and
   wherein the blocking tongue has a length that extends a majority of a perimeter of the semicircular top portion of the cover.

2. The optical disc storage case of claim 1, wherein the base and the cover are pivotally coupled by a hinge portion disposed between respective sides of the base and the cover.

3. The optical disc storage case of claim 2, wherein the base, the cover, and the hinge portion are formed integral to one another.

4. The optical disc storage case of claim 1, wherein the lateral support protuberance has a radius slightly larger than a radius of the optical disc.

5. The optical disc storage case of claim 1, wherein the thumb well is located near a bottom of the base.

6. The optical disc storage case of claim 1, wherein, when the optical disc storage case is in the closed position, the blocking tongue and the groove are engaged with one another such that access to the disc well is prevented when a user slightly separates respective top portions of the base and the cover.

7. The optical disc storage case of claim 1, wherein the semicircular top portions are formed from a transparent material such that a user can see inside the optical disc storage case when in the closed position.

8. An optical disc storage case, comprising:
   a base;
   a cover pivotally coupled to the base;
   a pedestal coupled to the base and having at least one pair of resilient members configured to retain an optical disc thereon;
   a blocking tongue coupled to a top portion of the cover and extending outwardly therefrom;
   a groove associated with a top portion of the base and extending outwardly therefrom, the groove configured to align the blocking tongue when the optical disc storage case is in a closed position and, when the pedestal is retaining the optical disc, the blocking tongue and the groove are engaged with one another such that access to the optical disc is prevented when a user slightly separates the respective top portions of the base and the cover;
   wherein the blocking tongue has a length that extends a majority of a perimeter of the top portion of the cover.

9. The optical disc storage case of claim 8, wherein the base and the cover are pivotally coupled by a hinge portion disposed between respective sides of the base and the cover.

10. The optical disc storage case of claim 8, wherein the base, the cover, and the hinge portion are formed integral to one another.

11. The optical disc storage case of claim 8, further comprising:
   a disc well associated with the base and substantially defined by a penannular disc support channel comprising:
      a ledge configured to provide vertical support for the optical disc; and
      a lateral support protuberance adjacent the ledge configured to provide lateral support for the optical disc.

12. The optical disc storage case of claim 11, further comprising a single thumb well coupled to the optical disc well and located near a bottom of the base.

13. The optical disc storage case of claim 8, wherein the base and the cover each have semicircular top portions.

14. The optical disc storage case of claim 8, further comprising a pair of retaining clips coupled to a bottom portion of the cover and operable to retain print media thereon.

15. The optical disc storage case of claim 8, further comprising a latch coupled to either a bottom portion of the base or a bottom portion of the cover and operable to secure the optical disc storage case in a closed position.

* * * * *